No. 722,583. PATENTED MAR. 10, 1903.
P. IMHOFF.
SECONDARY ELECTRODE FOR ELECTROLYTIC APPARATUS.
APPLICATION FILED DEC. 17, 1902.
NO MODEL.
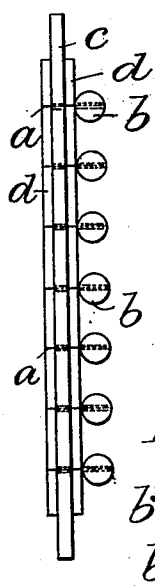
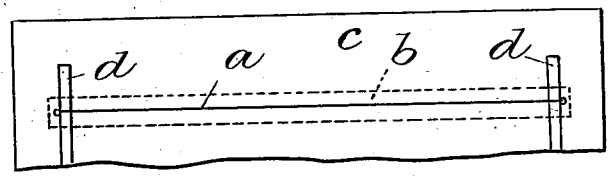
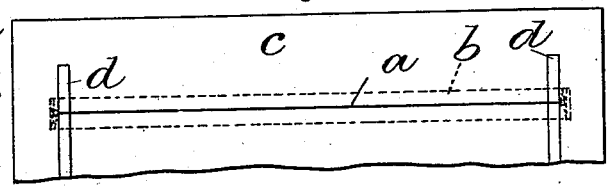
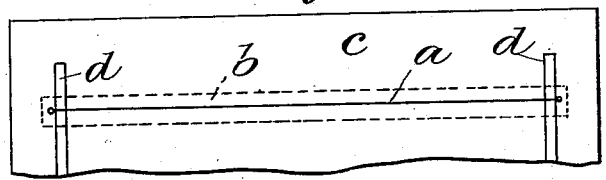
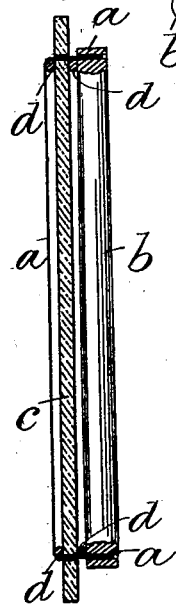
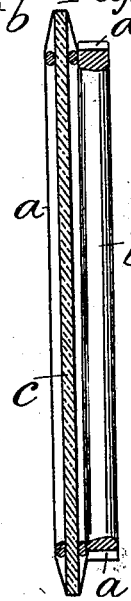
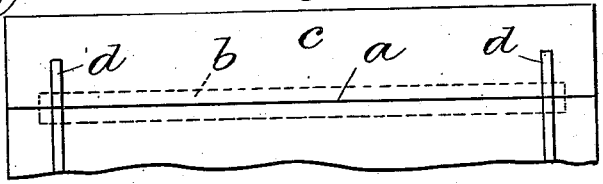
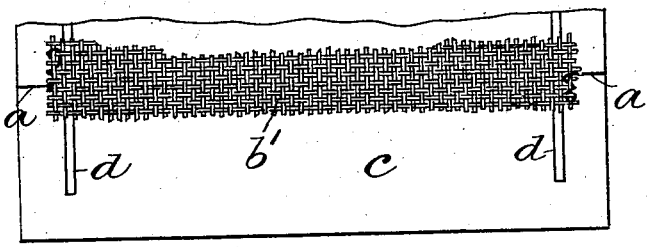

UNITED STATES PATENT OFFICE.

PAUL IMHOFF, OF LIVERPOOL, ENGLAND, ASSIGNOR TO THE UNITED ALKALI COMPANY, LIMITED, OF LIVERPOOL, ENGLAND.

SECONDARY ELECTRODE FOR ELECTROLYTIC APPARATUS.

SPECIFICATION forming part of Letters Patent No. 722,583, dated March 10, 1903.

Application filed December 17, 1902. Serial No. 135,517. (No model.)

*To all whom it may concern:*

Be it known that I, PAUL IMHOFF, Ph. D., chemist, a subject of the German Emperor, residing at 30 James street, Liverpool, in the county of Lancaster, England, have invented certain new and useful Improvements in Secondary Electrodes for Electrolytic Apparatus, More Especially Intended for Use in the Manufacture of Chlorates, of which the following is a specification.

This invention relates to secondary electrodes for electrolytic apparatus, more especially intended for use in the manufacture of chlorates. Several types of such secondary electrodes already exist, and among them are those in which the anode and cathode each consist of platinum sheet or wire and those in which the anode is formed of platinum sheet and the cathode is formed of some other metal, such as copper, the joint anode and cathode being separated or not by non-conducting or dielectric material except, of course, where the necessary electrical connection is made.

According to this invention the manufacture of chlorates, for example, by electrolysis is effected with improved results and without the use of the expensive platinum electrodes, as heretofore, by employing an anode built up of platinum wires or strips and a cathode of a cheaper conducting material in the form of wires, rods, plates, bars, strips, or gauze, both anode and cathode being built upon opposite sides of a non-conducting supporting plate or body of slate, glass, stone, or other suitable material. The necessary connections between the anode and cathode are made by bringing the ends of the platinum wires or strips of the anode around the edges of or through holes in the supporting plate or body and wrapping, welding, or otherwise fastening these ends to, in, or around adjacent portions of the cathode material.

The accompanying drawings show ways in which this invention can be performed.

Figure 1 is an edge view, and Fig. 2 a section at right angles showing the platinum wires of the anode passed through holes in the supporting-plate. Fig. 3 is an edge view, and Fig. 4 a section at right angles showing the platinum wires of the anode passed around the edges of the supporting-plate. Figs. 5 and 6 show a portion of the end and an end view of a cathode-rod with a slit in it for the reception of the platinum wire of the anode. Figs. 7 and 8 are like views showing a hole in place of a slit. Figs. 9, 10, 11, and 12 are face views of part of the anode side, Fig. 9 corresponding to Figs. 1 and 2 and Fig. 12 corresponding to Figs. 3 and 4; Figs. 10 and 11 respectively show the platinum wire wrapped around and secured in slits in the cathode-rod. Fig. 13 shows a face view of the cathode side, in which the cathode material is in the form of gauze.

In the several figures the platinum is shown in the form of wire $a$ and the cathode in rod form $b$, except in Fig. 13, where the cathode material is in the form of gauze; but it is to be understood that the form may be varied, as hereinbefore indicated. In all the figures the supporting-plate of electric non-conducting material which separates the anode and cathode material is marked $c$. Distance pieces or strips $d$ keep the anode material and the cathode material from contact with the plate $c$. These pieces or strips $d$ may be separate pieces or be formed in one with the plate $c$. In Figs. 1, 2, and 9 the ends of the anode-wires $a$ are shwon passed through holes in the plate $c$ and then through holes $b^2$, Figs. 7 and 8, in the cathode-rods $b$. In Figs. 3, 4, and 12 the ends of the anode-wires $a$ are shown passed around the edges of the plate $c$, and then through slits $b^3$, Figs. 5 and 6, in the ends of the cathode-rods $b$. In Fig. 10 the ends of the anode-wires $a$ are shown passed through holes in the plate $c$ and wrapped around the cathode-rods $b$. In Fig. 11 the ends of the anode-wires $a$ are shown passed through holes in the plate $c$ and through slits in the ends of the cathode-rods $b$. The ends of the wires $a$ may be secured in or to the rods $b$ by pressure, so as to make a firm contact between them. In Fig. 13 the ends of the anode-wires $a$ are shown passed around the edges of the plate $c$ and interlaced with the gauze cathode $b'$. When holes are used in the said supporting plate or body $c$, they may be filled in or not with cement, glaze, or other filling material. Very good results are obtained with a cathode of iron or of carbon; but other conducting material of less expensive character than platinum may be employed with similar results, and this invention is therefore not limited to the use of iron or carbon.

The improved secondary electrodes according to this invention give excellent results in practice and combine simplicity of construction with a minimum quantity of electrical power and of platinum.

Having now particularly described and ascertained the nature of the said invention and in what manner the same is to be performed, I declare that what I claim is—

1. Secondary electrodes consisting of an anode of platinum wires or strips, and a cathode of iron, carbon, or other conducting material of a less expensive character than platinum, in the form of wires, rods, plates, bars, strips, or gauze, and an intervening supporting plate, or body, of non-conducting material; the platinum, wires or strips, of the anode being passed through or around the edges of the said supporting plate, or body, and secured to, in, or around the respective wires, rods, plates, bars or strips, or gauze, constituting the cathode material.

2. Secondary electrodes consisting of an anode of platinum wires, or strips, and a cathode of iron, carbon, or other conducting material of a less expensive character than platinum, in the form of wires, rods, plates, bars, or strips, and an intervening supporting plate, or body, of non-conducting material; the platinum wires, or strips, of the anode, being passed around the edges of, or through holes in, the said supporting plate, or body, and secured in slits, or holes, in the respective wires, rods, plates, bars, or strips, of cathode material.

3. Secondary electrodes consisting of an anode of platinum wires, or strips, and a cathode of iron, carbon, or other conducting material of a less expensive character than platinum, in the form of wires, rods, plates, bars, strips, or gauze, and an intervening supporting plate, or body, of electrically non-conducting material, the platinum wires, or strips, of the anode being passed through holes in the said supporting plate, or body, and secured to, in or around, the respective wires, rods, plates, bars, strips, or gauze constituting the cathode material, and the holes in the said supporting plate, or body, being filled in with cement, glaze, or other filling material.

In testimony whereof I affix my signature in presence of two witnesses.

PAUL IMHOFF.

Witnesses:
CHARLES COLLINS,
THOMAS KENDRICK JONES.